Nov. 29, 1960  L. J. BULLIET ET AL  2,962,652
POSITION INDICATOR
Filed May 28, 1958  3 Sheets-Sheet 1
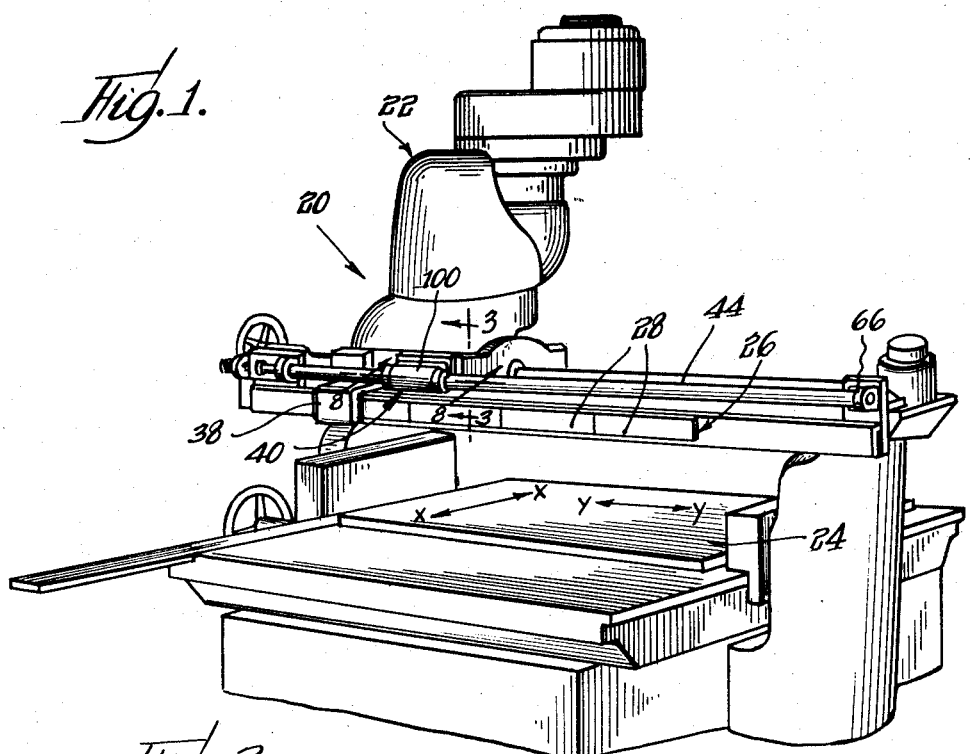
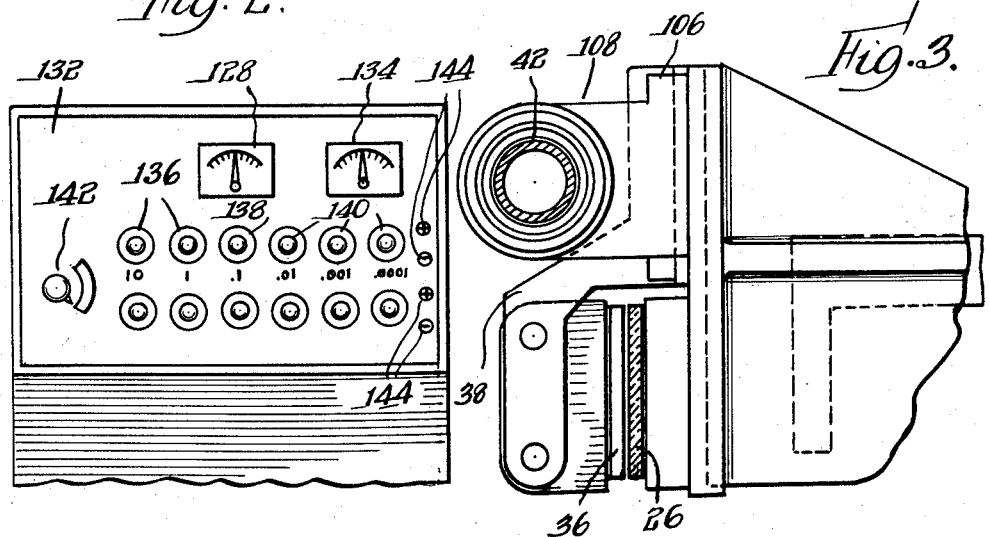
INVENTORS
LEANDER JACKSON BULLIET
DAVE PAUL YOUNGBERG (DECEASED)
BY SHIRLEY L. SPEIDEL
   LEGAL REPRESENTATIVE
BY Olson & Trexler
         attys.

Nov. 29, 1960

L. J. BULLIET ET AL 2,962,652

POSITION INDICATOR

Filed May 28, 1958

INVENTORS
LEANDER JACKSON BULLIET
DAVE PAUL YOUNGBERG (DECEASED)
BY SHIRLEY L. SPEIDEL
LEGAL REPRESENTATIVE

By: Olson & Trexler

Nov. 29, 1960    L. J. BULLIET ET AL    2,962,652
POSITION INDICATOR
Filed May 28, 1958    3 Sheets-Sheet 3
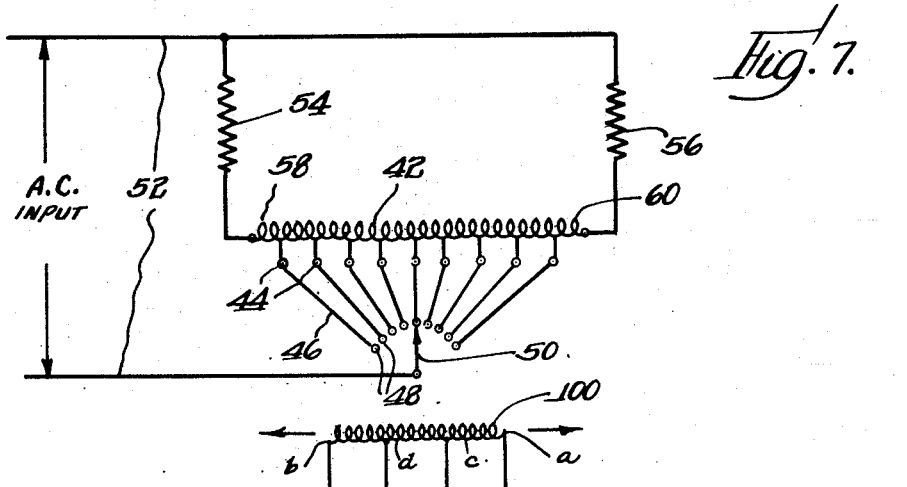
Fig. 7.
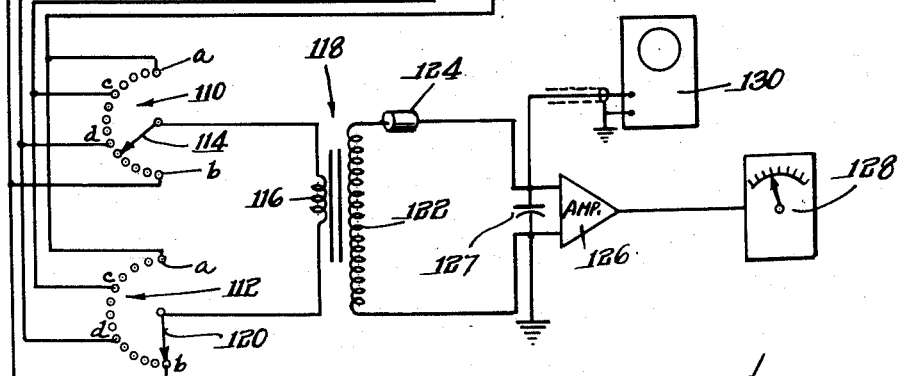
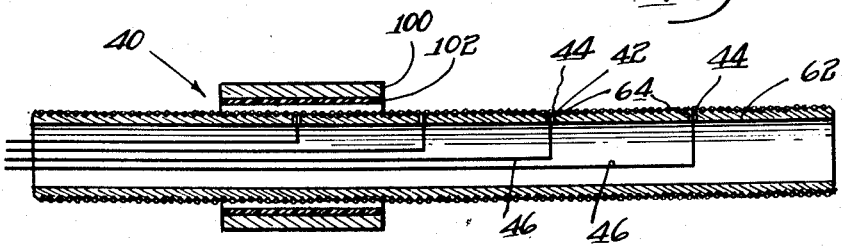
Fig. 8.
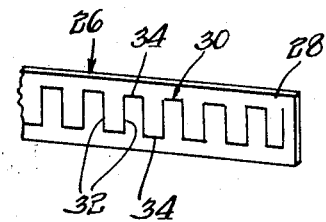
Fig. 9.
INVENTORS
LEANDER JACKSON BULLIET
DAVE PAUL YOUNGBERG (DECEASED)
BY SHIRLEY L. SPEIDEL
LEGAL REPRESENTATIVE
BY Olson & Trexler
ATTYS.

United States Patent Office 2,962,652
Patented Nov. 29, 1960

2,962,652

POSITION INDICATOR

Leander Jackson Bulliet, Rockford, Ill., and Dave Paul Youngberg, deceased, late of Loves Park, Ill., by Shirley L. Spidle, legal representative, Rockford, Ill., assignors to W. F. and John Barnes Company, Rockford, Ill., a corporation of Illinois Filed May 28, 1958, Ser. No. 738,536

19 Claims. (Cl. 323—53)

This invention is concerned with position control, as in a production machine or the like.

As is well known, various production machines require positioning of the working part or tool at a precise position. For example, a single vertical-spindle drilling machine may be used for drilling holes in flat plates, and the centers of the holes to be drilled have to be located quite precisely in many instances. As is well known, such positioning heretofore has been carried out by visual means, usually a scale including a vernier. Unfortunately, the use of such optical scales, and particularly the verniers thereof, has required considerable time and visual skill.

Accordingly, it is an object of this invention to provide electrical means for positioning the working tool of a production machine at a definite location, which means requires an operator only to press a plurality of buttons and to observe a null position on an indicating instrument.

More particularly, it is an object of this invention to provide a more or less rough indicator of position operable across the entire span of movement of a production machine or the like, said rough indicator being operable in conjunction with a final fine indicator.

Yet another object of this invention is to provide an electrical position indicator for use with a production machine or the like which indicates a null position, and wherein movement in either direction from the null position produces an increase in voltage up to a predetermined maximum, and wherein further movement from the null position produces no increase in voltage.

It is yet another object of this invention to provide an electrical null reading positioning device which indicates the direction from the null and, within some limits, indicates the distance therefrom.

Another object of this invention is to produce a null reading positioning device as outlined in the foregoing objects wherein one set of taps may be changed to shift the null point by major distance increments, and another set of taps may be changed to shift the null point by subdivisions of the major increments.

Other and further objects and advantages of the present invention will be apparent from the following description with reference to the accompanying drawings wherein:

Fig. 1 is a perspective view of a single vertical-spindle drilling machine to which the present invention is applied;

Fig. 2 is a fragmentary elevational view of a console used in conjunction with the machine;

Fig. 3 is a vertical sectional view taken generally along the line 3—3 in Fig. 1;

Fig. 4 is a vertical detail view taken generally from the left side of Fig. 3;

Fig. 5 is a plan view of the mechanism shown in Fig. 4;

Fig. 6 is a somewhat schematic view to smaller scale corresponding to Fig. 4 and showing certain of the electrical aspects of the invention;

Fig. 7 is a schematic wiring diagram showing the electrical principles of the invention;

Fig. 8 is a longitudinal sectional view through the position-sensing mechanism as taken along the line 8—8 in Fig. 1; and Fig. 9 is a perspective view of a part of the fine position measuring or sensing device.

Referring now in greater particularity to the figures of the drawing and first to Fig. 1, there will be seen a single vertical-spindle drilling machine of a type well known in the art and indicated by the numeral 20. The drilling machine includes a spindle head 22 mounted on a cross rail and movable in the direction marked Y—Y in Fig. 1. The spindle head is movable by means of a lead screw (not shown), but also could be moved by suitable hydraulic means. The machine further has a worktable 24 to which workpieces may be secured by suitable means such as screws, toe clamps, etc. (not shown). The worktable is movable in the direction indicated as X—X in Fig. 1, and may be moved by a lead screw driven by an electric motor controlled by forward and reverse pushbuttons. The lead screw also can be turned by a handwheel for slow precise motion. Alternatively, hydraulic movement could be incorporated. The specific structure for effecting the movement in the X—X and Y—Y directions is not shown, since this is well known in the art. In the conventional construction of the machine 20, each slide motion is provided with a scale and vernier reading to thousandths of an inch. Accordingly, the spindle centerline can be positioned to any desired location over the worktable, and hence over the surface of a workpiece, by setting the X and Y dimensions on the respective scales.

Such positioning by scale reading is time consuming and, to some extent, difficult. It is necessary for the operator to position himself next to the location of the scale and then to "sort out" the inch marks visually. The operator must further read the tenths, the hundredths, the vernier marks, etc. Accordingly, as set forth immediately hereinafter, the machine has been modified to incorporate electrical measuring or positioning devices. The devices for measuring or positioning in the Y—Y direction are shown and hereinafter described, and it will be understood that the devices are duplicated in the X—X direction.

For precise positioning, the machine is provided with a commercially available, electrical positioning device known as the Farrand Inductosyn made by Farrand Controls, Inc. of New York. This device comprises a scale 26 mounted in horizontal position on a fixed part of the machine. The device comprises a series of glass plates 28, each on the order of 10 inches long by about 2½ inches wide and ½ inch thick. Conductive material is printed or otherwise impressed on the glass in a zigzag pattern of fine lines, as indicated at 30 in Fig. 9. The more or less zigzag lines 30 comprise spaced apart vertical lines or sections 32 interconnected by horizontal sections 34.

A pickup or slider 36 is carried by a bracket 38 carried from the spindle head. The pickup or slider is similar to the scale 26, being made of a glass plate having more or less zigzag conductive lines thereon. The pickup slides along but does not touch the scale as the spindle head 22 is moved.

When an alternating current is supplied to the conducting lines on the slider, it induces an alternating voltage in the pattern on the scale. If the slider is now moved parallel to the scale, the value of the induced output voltage from the scale is thereby varied. This is due to change in inductive coupling between the two patterns, Specifically, when the vertical lines of the slider pattern are directly opposite those of the scale pattern, the induced voltage will be maximum. The phase of the output voltage, at a maximum, will depend upon the geometrical relation between the zigzag patterns on the slider and the scale. Thus, when the top and bottom connections 34 on the scale are respectively opposite top and bottom connections on the slider, the output voltage is of one phase. When the slider moves to the next condition for a maximum induced output, the top horizontal connections on the slider will be opposite intervals for which the scale horizontal connections are at the bottom. This results in an induced output scale voltage equal in magnitude to that previously described but of opposite phase thereto.

When the vertical conductors on the slider are halfway between two successive conditions for maximum output voltage, the output voltage is zero or null. Thus, with constant value alternating current supplied to the slider and the slider being moved relative to the scale, there is an alternating voltage from the scale pattern whose amplitude continuously varies between maxima of opposite phases with null condition between. Those skilled in the art will recognize this behavior as equivalent to that of a single-primary, single-secondary resolver wherein the secondary voltage passes through two nulls and two maxima of opposite phase for each full revolution of the resolver shaft. If a complete revolution of a rotary resolver shaft is considered a "cycle" of operation, then a "cycle" of operation in the Inductosyn system is the distance the slider must move to produce a like sequence of output voltage values and phases.

As is well known in the art relating to resolvers, a resolver is often furnished with two primary windings arranged ninety degrees apart. If these two primaries are supplied with alternating current of the same phase but of different values, then turning the secondary will cause the same sequence of nulls and maxima in the output voltage except that the angular locations of the nulls and maxima will be variable in accord with the relative magnitudes of the primary currents. By suitably adjusting the primary excitations, the nulls may be caused to appear at any chosen angles within the resolver cycle of operation.

In the Inductosyn positioning device, the slider is provided with two zigzag patterns so interleaved and spaced with respect to one another that they produce the same effect in the scale pattern as do two mutually perpendicular primary windings in a rotary resolver. The alternating currents fed to the slider patterns may then be so adjusted in relative magnitude as to position the output nulls at any desired positions within a cycle of operation.

The precision with which a null position can be predetermined is very great provided the length of the cycle of operation is kept small. For example, in commercially available equipment, the cycle of operation is one tenth inch and the slider currents can be so controlled as to predetermine null locations at intervals of 0.0001 inch. The amplified and demodulated output from the scale is fed to a D.C. indicating instrument with a zero-center scale. When the slider is in position to produce a null, the instrument indicates zero. When the slider is slightly displaced from null, the instrument indicates other than zero and the sense of this indication tells the direction the slider must be moved to reach the nearest null.

Further description of the Inductosyn system is not warranted since it is a commercially available device and it does not in itself constitute a part of this invention. Furthermore, the details of the device have been disclosed in various publications. One fairly complete description appears in the January 1958 issue of Control Engineering, a publication of the McGraw-Hill Publishing Company.

Because of the previously described cyclical nature of the system operation, the sequence of nulls and maxima will be repeated for each tenth of an inch as the slider is moved along the scale. Thus, although the system is adapted for very precise indication of position within a tenth-inch interval, it is not capable of indicating which particular tenth-inch interval the slide is in.

Accordingly, this invention supplies a measuring or positioning device operable over the entire range of movement of the machine for indicating which tenth inch is under consideration.

Concurrent with consideration of the physical construction of the coarse-measuring device, it is thought best to advert to the electrical aspects as illustrated in the schematic wiring diagram of Fig. 7.

The coarse-measuring device, generally indicated by the numeral 40, comprises a primary winding 42. The primary winding comprises a great many coils and extends across the width of the machine 20. The primary is wound on a suitable support, a polystyrene rod having been found satisfactory but an aluminum tube also having been found satisfactory and being considered preferable due to the absence of any chance of sagging with age. Whichever coil form is used, it preferably is threaded, with the wire of the primary 42 being wound in the thread in order to insure accurate positioning of the turns of the primary. The primary is provided with a plurality of taps 44. The showing in Fig. 7 has been simplified somewhat since the taps 44 are typically positioned at every inch along the primary, and the primary is likely to be on the order of several feet in length. Thus, the number of taps shown in Fig. 7 is illustrative, not necessarily representative. The taps are directly connected by means of wires 46 to the fixed contacts 48 of a tap switch having a movable contact 50. The movable contact is connected to one side of an A.-C. input line 52.

The A.-C. input line 52 may comprise the usual 110 volt, single phase, 60 cycle power line, although it has been found that somewhat more satisfactory operation is found at higher frequencies such as 540 cycles per second. Too high frequencies are to be avoided due to electrical losses, particularly when an aluminum tube is used as the form for the primary.

The opposite side of the A.C. input line 52 is connected through a resistor 54 to the left side of the primary 42. The same side of the line connected to the resistor 54 is also connected to a resistor 56, the latter being connected to the opposite or right end of the primary 42. The two resistors 54 and 56 are of identical value, and 600 ohms has been found to be a satisfactory value for 110 volt operation. The resistance of the primary 42 is quite low and hence the resistors 54 and 56 comprise essentially a constant current source for the primary 42. Thus, regardless of which of the taps 48 the moving contact 50 engages, substantially the same identical currents (but of opposite phase) will be carried by the sections of the primary to the left of the tap 44 associated with the contact 48 engaged by the moving contact 50, and to the right thereof. It will be observed that extra turns 58 are provided to the left of the extreme leftmost tap 44, while similar turns 60 are provided to the right of the extreme rightmost tap 44. The purpose of this will be explained hereinafter in connection with the secondary now to be described.

A cross section of the device 40 is shown in Fig. 8, the primary 42 being shown as wound on an aluminum tube 62. The tube is externally threaded as heretofore indicated, and the wires 46 from the taps 44 are brought through small holes 64 in the tube into the interior of the tube.

The tube 62 is provided at its right end with a plug having a rod 65 extending therefrom and received in a bracket or journal 66 on a fixed part of the machine, see Figs. 4–6 particularly. At the left end, a plug 68 is inserted in the tube, forming a press fit therewith. The plug may be additionally secured mechanically. The plug is provided with a rod or cylinder 70 extending to the left of the tube 62, and is received in a bracket or journal 72 on a fixed part of the machine. A flange extension 74 is provided with a suitable recess receiving a pin 76 projecting axially from the bracket 72 whereby to preclude rotation of the tube 62.

The opposite end of the rod 70 is threaded, as at 78, and a pair of nuts 81, one of which serves as a jam nut, holds a washer 82 thereon, thereby compressing a spring 84 encircling the rod and abutting the bracket 72. Accordingly, the rod 70, and hence the tube 62 and primary 42 are spring urged to the left.

A sleeve 86 is adjustably fixed in an outrigger flange 80 of the bracket 72 in alignment with the end of the rod 70. The sleeve 86 is provided with a flange or head 88 having a marker 90 thereon. This marker cooperates with a scale 92 on the knurled knob or head 94 of a screw 96 threaded through the sleeve 86 and abutting the end of the rod 70. The screw 96, including the head 94 and scale 92 thereon, constitutes a micrometer type of device for adjusting the zero position of the rod 70 and hence of the tube 62 and primary coil or winding 42.

The fine measuring device initially described is also provided with a micrometer type of adjustment indicated rather generally at 98.

The coarse positioning device also includes a secondary winding 100. The secondary winding comprises a substantial number of turns of wire on a relatively short tubular base, preferably made of plastic, and indicated at 102 in Fig. 8. The secondary 100 and the winding form or tube 102 are mounted by a bracket 104 fixed on the head 22 for movement thereof in the Y—Y direction. The secondary is in closely spaced concentric relation with the primary, and is axially movable relative thereto. As best may be seen in Figs. 4 and 5, the bracket 104 comprises a central plate or web 106 having a pair of extending arms 108 at the opposite ends thereof mounting the tube or form 102 adjacent its opposite ends.

The movable secondary 100 is provided with a plurality of taps, 14 being one example, said taps being spaced apart 0.100 inch. A pair of tap switches 110 and 112 is provided, each having the same number of taps at the secondary 100. Thus, one outermost contact *a* of the switch 110 is connected to the end tap *a* of the secondary 100. The corresponding outermost tap *a* of the switch 112 also is connected to the secondary tap *a*. Correspondingly, the tap *b* at the other end of the secondary 100 is connected to the fixed contact *b* at the opposite limits of the switches 110 and 112. Two intermediate taps *c* and *d* are shown on the secondary 100, and these are respectively connected to the fixed contacts *c* and *d* of the switches 110 and 112, at intermediate positions of these switches. The remaining contacts are correspondingly connected to the remaining taps, but the connections have been omitted to avoid turning the drawings into a hopeless maze. As will be understood, the number of taps heretofore mentioned as exemplary may vary substantially in accordance with the requirements of the machine on which the positioning device is mounted.

The movable contact 114 of the switch 110 is connected to one end of the primary winding 116 of an impedance matching transformer 118. The movable contact 120 of the second tap switch 112 is connected to the other end of the primary winding 116. The contacts 114 and 120 are movable to include different segments of the secondary 100 between the ends of the input winding 116 of the impedance matching transformer. At any time the secondary segments included between the contacts 114 and 120 constitute the "active secondary."

The secondary winding 122 of the transformer 118 is connected through a shielded cable 124 to the input of a 10× or 100× decade amplifier 126. The amplifier is provided with a capacitor input 127, and the output thereof is connected to an indicating instrument or meter 128. In addition, an oscilloscope 130 may be connected across the input of the amplifier 126 for test purposes.

The meter 128 is mounted on the panel of a console 132, as is a meter 134 associated with the fine positioning device initially described. Both meters are zero reading or null meters, and the needle thereof deflects in one direction or the other according to the direction which the pickup or secondary, and hence the head and operating tool are displaced from the desired position. In the case of the meter 128, A.-C. potential can be applied directly thereto, and the meter can be one that is sensitive to phase as well as to potential. Alternatively, the meter 128 could be a D.-C. meter, and the A.-C. output of the amplifier 126 could be rectified and demodulated with the output polarity dependent on the input A.-C. phase.

Referring again to Fig. 7, it will be understood that the primary circuit includes a substantially constant current generator, as previously described. Since the two ends of the primary are on one side of the A.-C. input line 52 and the moving contact is on the other, it will be seen that the currents in the two ends of the primary are effectively 180° out of phase with each other. As the secondary is slid over the junction of the two primary winding segments as determined by the position of the movable contact 50, voltages of both phases are induced in the secondary. When the active secondary is centered over the chosen tap on the primary, the voltages are equal and 180° out of phase. Thus, there is no output from the device at this time. The switches 110 and 112 are usually so positioned relative to one another that the active secondary always includes the same number of segments and so embraces the same number of primary turns. Therefore, since the primary incorporates a substantially constant current source, the ampere turns in the primary linked to the secondary are constant. The end windings 58 and 60 of the primary are provided so that the secondary will not "fall off" if one of the end taps 44 is selected by the movable contact 50. Operation of the switch arm or moving contact 50 thereby allows the null position to be selected to the nearest inch. Subsequent manipulation of the contacts or arms 114 and 120 allows selection to be made to the nearest one-tenth inch or, more specifically, the nearest 0.100 inch. This latter manipulation is accomplished by shifting the switch contacts 114 and 120 in unison. Shifting them both one tap in the same direction, for instance, effectively shifts the center of the active secondary one-tenth inch. A convenient arrangement is to have the switch members 114 and 120 on a single shaft so that they will move in unison and maintain the predetermined number of secondary segments between them. On the other hand, in some cases, it is convenient to move only one of the switches (114 or 120). This makes a slight difference in output voltage, when different from null, but it shifts the null only half as far. By this means, it is possible to move the null as little as 0.050 inch. In connection with the console of Fig. 2, it will be understood that the dials 136 are used for positioning to ten inches and one inch, respectively, it being understood that an extremely long primary such as in Fig. 1 is most conveniently provided with a series of taps every ten inches corresponding to the taps 44 and having a single moving contact corresponding to the contact 50 associated therewith. The first dial thus may select the ten-inch group in which the null is to be located. The dial 138 controls the arms 114 and 120, while the remaining three dials 140 control the fine measuring or positioning device initially described.

It will be observed that there are two rows of the dials 136, 138 and 140, the upper corresponding to the X—X direction and the lower corresponding to the Y—Y direction. A selector switch 142 is provided on the console for determining which row is to be active and, as aforenoted, the positioning devices or mechanisms for use in the X—X direction are the same as those disclosed in connection with the Y—Y direction. At the right side of the console, there are provided two pairs of jog buttons 144. The pair of buttons to be active depends upon the position of the switch 142, and one button of each pair is connected to run the spindle head or table-positioning motor, respectively, either forward or in reverse, as necessary. Thus the operator utilizes a pair of the jog buttons 144 to bring the meter 128 to a null reading, and then subsequently brings the meter 134 to a null reading by utilizing the jog buttons as heretofore, or by hand manipulation of the feed screw. As will be apparent, the needle of the meter 134 will swing back and forth during the rough positioning, but the operator simply ignores this.

As long as the active tap of the primary, as selected by the arm or moving contact 50, lies within the active part of secondary winding 100, there will be opposed voltages induced in the secondary, as indicated heretofore. As the secondary moves off the null position in one direction or the other, one of the opposing voltages will increase, and the other will decrease, until the secondary has completely passed the active tap. At this time, the resulting output voltage of the secondary is at a maximum, and continued movement of the secondary away from the null position does not result in further increased output voltage from the secondary. Hence, the secondary can be moved over an extreme range relative to the primary without the necessity for any provision to prevent a damagingly high voltage.

In actual use, it has been found that, for displacements of less than 0.010 inch away from the null position to 0.1 inch away, the output voltage varies linearly. From about 0.1 inch to about 0.6 inch at 60 c.p.s. and from about 0.1 inch to about 0.3 inch at 540 c.p.s., the voltage variation is nearly linear. The linearity of the output voltage breaks sharply at these locations, forming a knee in a curve plotted of the voltage. The knee is much sharper at 540 c.p.s. than it is at 60 c.p.s., and it is for this reason that it heretofore has been indicated that 540 c.p.s. may, in some instances, be preferred. If the frequency is increased substantially more than this, for example, somewhat beyond double the 540 c.p.s. mentioned, the eddy current losses in the aluminum tube on which the primary is wound may become too great.

In the foregoing, the invention has been described as a coarse positioning device to be used in conjunction with a cyclically operating positioning device of much greater precision. While this may be the most pertinent application of the invention, it is clear that the invention could be used without such other devices in cases where the required precision is within the capabilities of the invention alone. In this connection, it may be noted that the limited range of linear voltage variation can be used as an indication of the distance and direction from a null position. Thus the output instrument 128 can be calibrated in distance units and its deflection can be used to indicate position between nulls. The precision of such deflection indications will not be comparable to that of the fine indicator described but will be useful in some applications.

It should be noted that the invention can be con tructed in accord with units and subunits of measurement other than inches and decimal parts of inches. This would involve simply alterations in the dimensions of the primary and secondary windings.

Although manual positioning has been shown and described, it will be apparent to those skilled in the art that an automatic system could be used. As is well known, servomechanisms depend on a null reading, the servomotors running in one direction or the other in accordance with the distance from null, and slowing down as the voltage decreases, finally stopping as the voltage reaches zero. As has been noted, such mechanisms are well known and hence are not discussed further herein.

It will now be apparent that there has been herein disclosed an improved electrical device or system for positioning or measuring rapidly to the nearest one-tenth inch, which is operable in conjunction with a known commercial device for positioning to the nearest 0.0001 inch within any given tenth inch. Hence, the desired positioning of a workpiece or tool readily can be accomplished without any substantial skill on the part of the operator other than presettting a few dials and then punching selected buttons until a pair of meters have been brought to null or zero readings.

It is to be understood that the specific example of the invention as herein shown and described is for illustrative purposes only. Various changes in structure will no doubt occur to those skilled in the art, and will be understood as coming within the scope of the invention insofar as they fall within the spirit and scope of the appended claims.

The invention is claimed as follows:

1. An electric position-indicating apparatus comprising an elongated primary winding, a pair of terminals on said primary winding positioned, respectively, on opposite sides of a central portion of said primary winding, an intermediate tap on said central portion of said primary winding intermediate of said winding terminals, a source of alternating potential having two terminals, connecting means for connecting said intermediate tap to one of said terminals of said source and both of said winding terminals to the other of said terminals of said source, a secondary winding inductively coupled with said primary winding and axially movable with respect thereto along said central portion, whereby when an alternating potential from said source is impressed on said primary winding through said connecting means, an alternating voltage is induced in said secondary winding of a magnitude and a phase angle, relative to the phase angle of the source, which are dependent upon the axial position of said secondary winding relative to said intermediate tap, and electroresponsive means connected to said secondary winding so as to be responsive to the voltage induced therein.

2. An electric position-indicating apparatus comprising an elongated primary winding, a pair of terminals on said primary winding positioned, respectively, on opposite sides of a central portion of said primary winding, an intermediate tap on said central portion of said primary winding intermediate of said winding terminals, a source of alternating potential having two terminals, connecting means connecting said intermediate tap to one of said terminals of said source and both of said winding terminals to the other of said terminals of said source, a secondary winding inductively coupled with said primary winding and axially movable with respect thereto along said central portion, whereby when an alternating potential from said source is impressed on said primary winding through said connecting means, an alternating voltage is induced in said secondary winding the magnitude of which is dependent upon the axial position of said secondary winding relative to said intermediate tap, and voltage responsive means connected to said secondary winding so as to be responsive to the magnitude of the voltage induced therein.

3. An electric position-indicating apparatus comprising an elongated primary winding, a pair of terminals on said primary winding positioned, respectively, on opposite sides of a central portion of said primary winding, an intermediate tap on said central portion of said primary winding intermediate of said winding terminals, a source of alternating potential having two terminals, connecting means connecting said intermediate tap to one of said terminals of said source and both of said winding terminals to the other of said terminals of said source, a secondary winding inductively coupled with said primary winding and axially movable with respect thereto along said central portion on opposite sides of said intermediate tap, whereby when an alternating potential from said source is impressed on said primary winding through said connecting means, an alternating voltage is induced in said secondary winding the phase of which is dependent upon the axial position of said secondary winding relative to said intermediate tap, and phase angle responsive means connected to said secondary winding so as to be responsive to the phase angle of the voltage induced therein.

4. An electric position-indicating apparatus comprising an elongated primary winding, a pair of terminals on said primary winding positioned, respectively, on opposite sides of a central portion of said primary winding, an intermediate tap on said central portion of said primary winding between said winding terminals, a source of alternating potential, connecting means connecting said winding terminals and said intermediate tap to said source so that currents out of phase with each other flow in said primary winding on opposite sides of said intermediate tap, a secondary winding inductively coupled with said primary winding and axially movable with respect thereto along said central portion, whereby, when said currents flow in said primary winding, an alternating voltage is induced in said secondary winding which is dependent upon the axial position of said secondary winding relative to said intermediate tap, and electro-responsive means connected to said secondary winding so as to be responsive to the voltage induced therein.

5. An electric position-indicating apparatus according to claim 1 in which the primary winding has a plurality of taps spaced axially from each other along said central portion, means are provided to connect said one terminal of said source to said intermediate taps, selectively, and said secondary winding is movable along said central portion on opposite sides of at least some of said intermediate taps.

6. An electric position-indicating apparatus in accordance with claim 1 in which the secondary winding has a plurality of axially spaced secondary taps thereon and means are provided to connect said electroresponsive means to pairs of said secondary taps, selectively.

7. An electric positioning apparatus as set forth in claim 1 wherein the primary winding has a plurality of additional intermediate taps intermediate the winding terminals, said connecting means including means for selectively connecting one of said intermediate taps to said one of said terminals of said source.

8. An electric positioning apparatus as set forth in claim 1 wherein the secondary winding has a plurality of output terminals, and means are provided to connect the electroresponsive means to pairs of said output terminals, selectively.

9. An electric position-indicating apparatus comprising a relatively long primary winding, a pair of electric connection means on said primary winding respectively relatively toward the opposite ends thereof, a plurality of selectable taps on said primary winding intermediate the ends thereof, a source of substantially constant single phase current, means connecting one side of said source to a selected one of said taps and the other side of said source to both of said electric connection means, a relatively short secondary winding coaxial with said primary winding and axially movable relative thereto, a pair of electric connection means on said secondary winding relatively toward the opposite ends thereof, whereby an A.-C. voltage is induced in said secondary winding by current flowing in said primary winding, the potential and phase of which depend on the axial position of said secondary winding relative to the selected tap on said primary winding, and electric means connected to the electric connection means on the secondary winding and responsive to the potential and phase of the voltage induced in said secondary winding.

10. An electric positioning apparatus as set forth in claim 9 wherein the pair of electric connection means on the primary winding are respectively at the extreme opposite ends thereof and axially spaced outwardly from the closest of the intermediate taps.

11. An electric positioning apparatus as set forth in claim 9 and including a plurality of taps on the secondary winding, two of said taps comprising the pair of electric connection means on said secondary winding, and wherein the potential and phase responsive electric means are selectively connected to a pair of the taps on said secondary.

12. An electric positioning apparatus as set forth in claim 9 wherein the substantially constant current A.-C. source comprises a conventional source of A.-C. potential and a pair of resistors connected to said conventional source and respectively connected to the pair of electric connection means on the primary winding, the resistance of each of said resistors being high relative to the resistance of said primary winding.

13. An electric position-indicating apparatus comprising a primary winding, a pair of electric connection means on said primary winding respectively relatively toward the opposite ends thereof, a plurality of selectable taps on said primary winding intermediate the ends thereof, a source of single phase current, said primary winding being wound on a hollow tube and connections for said taps being taken out interiorly of said tube, means connecting one side of said source to one of said taps and the other side of said source to both of said electric connection means, a secondary winding coaxial with and surrounding said primary winding and axially movable relative thereto, a pair of electric connection means on said secondary winding relatively toward the opposite ends thereof, whereby an A.-C. voltage is induced in said secondary winding by current flowing in said primary winding, the magnitude and phase of which depend on the axial position of said secondary winding relative to the selected tap on said primary winding, and electric means connected to the electric connection means on the secondary winding and responsive to the magnitude and phase of the voltage induced in said secondary winding.

14. An electric positioning apparatus as set forth in claim 13 wherein the tube on which the primary winding is disposed is externally threaded and the winding is positioned in the threads.

15. An electric positioning apparatus as set forth in claim 13 wherein the tube on which the primary winding is disposed comprises an aluminum tube.

16. In a machine having a fixed frame and a part thereon movable with respect to a workpiece, an electric position-indicating apparatus comprising a primary winding, a pair of electric connection means on said primary winding respectively relatively toward the opposite ends thereof, a tap on said primary winding intermediate the ends thereof, a source of single phase current, means connecting one side of said source to said tap and the other side of said source to both of said electric connection means, a secondary winding inductively coupled with the primary winding, one of said windings being fixed relative to said frame and the other being movable with the part cooperable with a workpiece, said windings being relatively axially movable, a pair of electric connection means on said secondary winding relatively toward the opposite ends thereof, whereby an A.-C. voltage is induced in said secondary winding by current flowing in said primary winding, the potential and phase of which depend on the axial position of said secondary winding relative to the tap on said primary winding, and electric means connected to the electric connection means on the secondary winding and responsive to the potential and phase of the voltage induced in said secondary winding.

17. In a machine as set forth in claim 16 wherein the positioning apparatus is operable to a predetermined limit of measurement, and further including a fine positioning device cyclically operable for positioning within said limit.

18. In a machine as set forth in claim 17, electric positioning apparatus wherein the primary winding is relatively long and the secondary winding is relatively short, wherein the source of A.-C. potential comprises a substantially constant current source, said primary winding having a plurality of taps thereon selectively connected to one polarity of said A.-C. potential, and wherein the secondary winding has a plurality of taps thereon, two of which comprise the electric connection means on the secondary winding, said responsive electric means being selectively connected to two of said taps.

19. An electric positioning apparatus comprising a relatively long primary winding, a pair of electric connection means on said primary winding respectively relatively toward the opposite ends thereof, a plurality of taps on said primary winding intermediate the ends thereof, a source of substantially constant current A.-C. potential, means connecting one polarity of said A.-C. potential to a selected one of said taps and a second polarity to both of said electric connection means, a relatively short secondary winding in inductive relation with said primary winding and axially movable relative thereto, a pair of electric connection means on said secondary winding relatively toward the opposite ends thereof, an A.-C. voltage being induced in said secondary winding, the potential and phase of which depend on the axial position of said secondary winding relative to the tap on said primary winding, and electric means connected to the electric connection means on the secondary winding and responsive to the potential and phase of the voltage induced in said secondary winding.

No references cited.